Dec. 1, 1964  W. SCHWEIZER  3,159,055
HYDROMECHANICAL CHANGE-SPEED AND REVERSING TRANSMISSION
Filed July 3, 1963
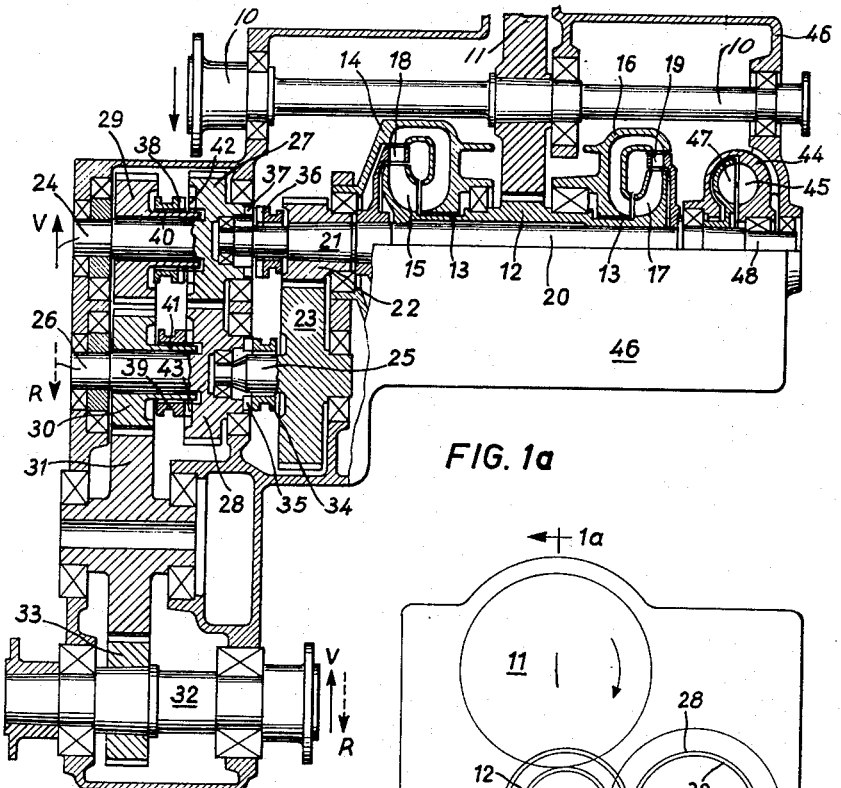
FIG. 1a
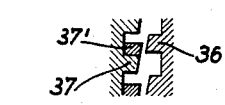
FIG. 1b
FIG. 1c
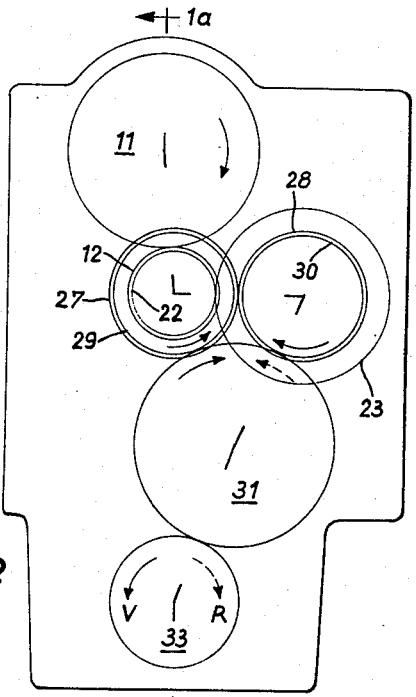
FIG. 2
INVENTOR
WALTER SCHWEIZER
BY K.A. Mayr
ATTORNEY

United States Patent Office 3,159,055
Patented Dec. 1, 1964

3,159,055
HYDROMECHANICAL CHANGE-SPEED AND
REVERSING TRANSMISSION
Walter Schweizer, Friedrichshafen-Manzell, Germany, assignor to Maybach-Motorenbau G.m.b.H., Friedrichshafen, Germany, a firm of Germany
Filed July 3, 1963, Ser. No. 292,563
Claims priority, application Germany, Aug. 23, 1962,
M 54,005
12 Claims. (Cl. 74—732)

The invention relates to a hydromechanical change-speed and reversing transmission having at least four speeds, particularly for motorized high speed and/or low speed rail vehicles, for example, multi-purpose diesel locomotives.

The hydraulic part of the transmission according to the invention comprises a group of individually controllable Föttinger circuits including a hydraulic rotary torque converter for great increase of the moment and at least one additional Föttinger circuit including a hydraulic torque converter or a hydraulic clutch. The pump wheels of all circuits are mounted on a common drive shaft and the turbine wheels of all circuits are also mounted on a common driven shaft, one of said shafts being hollow and the second shaft being concentric of the first shaft.

The mechanical part of the gear according to the invention comprises a spur gear reversing gear having a drive shaft coaxial of the concentric shafts of the Föttinger group. The reversing gear comprises a pair of equal reversing gears whose teeth are in mesh with the teeth of a reversing gear output gear. The mechanical part of the transmission also comprises a spur gear two-speed change-speed gear provided with claw clutches, one for slow speed and the second for high speed operation.

In a conventional transmission of the above described type the Föttinger group has three circuits, two converters and a clutch by-passing the second converter. A change-speed gear which comprises two pairs of gears of different speed ratios is arranged in series relation with the reversing gear and after the latter. This change-speed gear can be shifted only when standing still, a gear shift clutch being arranged on the output shaft of the entire transmission.

The components of the transmission according to the invention, i.e. the Föttinger circuits and the gear transmissions are so arranged that there is only one pair of gears forming one speed stage after the Föttinger group whereby one gear of said pair is mounted on an extension of the common shaft of the turbine wheels of the Föttinger group and the second gear of said pair of gears is mounted on a shaft coaxial of the second reversing gear shaft. There is a conventional rejecting claw clutch, for example as shown in Patent No. 2,667,252, between the gears of the change-speed gear pair and the two input gears of the reversing gear. The claws of said claw clutches have substantially axial torque transmitting faces and end faces which are inclined in the circumferential direction. There is a speed of rotation equating device affording engagement of the rejecting claw clutches upon equalization of the rotational speed of the mating clutch parts.

Due to the arrangement of the gear elements according to the invention a special gear pair for the second speed is unnecessary. The reversing gear output shaft can be placed so low in the vehicle that no additional gear is required for lowering the location of the output shaft. A particular advantage of the arrangement according to the invention is the possibility of shifting from one speed range to another speed range while the transmission and the vehicle driven thereby are in motion.

If the Föttinger group comprises, for example, two converters the vehicle can be driven by the converters via the change-speed gear pair within one speed range and, via the input gears of the reversing gear, in the second speed range, whereby each speed range has two speeds. Since the change-speed gear is arranged immediately after the Föttinger group, where the torque is small, the speed change clutches can be considerably smaller than in conventional arrangements wherein these elements are on the output shaft of the entire transmission. When shifting from one speed to another the traction is interrupted, as in conventional transmissions. This, however, can hardly be noticed due to the higher speed and correspondingly smaller traction. The first speeds within the range of low speed and great traction are operated without interruption of traction and shift from low speed operation to high speed operation can be effected without stopping the output shaft and the vehicle driven thereby.

In order to minimize the duration of interruption of the traction and to assure complete engagement of the claw clutches, locking claws are provided which, when the clutch is disengaged, are projected in circumferential direction by springs about halfway into the gaps between the torque transmitting claws. The locking claws project beyond the torque transmitting faces of the torque transmitting claws which are axially longer due to the aforedescribed circumferential inclination of the end faces of the claws. The locking claws have surfaces forming a continuation of the inclined end faces of the torque transmitting claws when the clutch is disengaged and the locking claws are fully projected. After reversal of the relative circumferential movement of the mating claws of the two clutch halves the locking claws are moved against the action of the aforementioned springs out of the gaps between the torque transmitting claws, by the claws of the mating clutch part so that the claws of the latter can completely enter the gaps between the torque transmitting claws of the first clutch part.

It is preferable to construct the pair of change-speed gears for speed reduction and slow speed operation. For high speed operation the torque is transmitted directly from the turbine wheel shaft of the converters to the input gears of the reversing gear.

The first gear of the pair of change-speed gears is preferably made fast on an extension of the turbine wheel shaft and the second gear of the pair of change-speed gears is mounted on or integral with the second change-speed shaft. A clutch sleeve is axially movable on each shaft for selectively connecting the respective gears to the input gears of the reversing gear.

The speed equating device for retarding the rotational speed of the clutch which must be engaged during operation and movement of the vehicle may be in the form of a brake, a Föttinger fluid clutch, or the like and is arranged at the free end of the turbine shaft of the Föttinger fluid torque converter group. This arrangement saves space and makes the device easily accessible. If the device is in the form of a Föttinger fluid clutch, it can also be used for braking the vehicle.

In the arrangement according to the invention two converters are preferably in mirror-symmetric position and provided with a common hollow pump shaft which is driven, for example, by a Diesel engine through speed increasing gears which are placed between the converters.

The novel features which are considered characteristic of the invention are set forth with particularity in the appended claims. The invention itself, however, and additional objects and advantages thereof will best be understood from the following description of an embodiment thereof when read in connection with the accompanying drawing wherein:

FIG. 1a is a longitudinal part-sectional view of a transmission according to the invention represented as rolled out along line 1a—1a of FIG. 2.

FIGS. 1b and 1c illustrate a detail of the claw clutches used in the transmission shown in FIG. 1a.

FIG. 2 is a diagrammatic layout of the gears forming part of the transmission according to the invention.

Referring more particularly to FIGS. 1a and 2 of the drawing, numeral 10 designates a drive shaft which is driven by a diesel engine, not shown, and rotates in the direction of the arrow shown at the left end of the shaft 10 in FIG. 1a. The torque is transmitted through a pair of gears 11, 12 to a hollow pump wheel shaft 13 whereby the speed of rotation is increased.

The shaft 13 carries the pump wheel 15 of a torque converter 14 capable of considerably increasing the transmitted torque. The shaft 13 also carries a pump wheel 17 of a torque converter 16 which is designed to operate at good efficiency at partial loads. The gear 12 is connected to or forms part of the shaft 13 between the converters 14 and 16. The latter are arranged mirror-symmetrically. The turbine wheels 18 and 19 of the converters 14 and 16, respectively, are mounted on a common shaft 20 which extends through the hollow of the shaft 13.

The turbine wheel shaft 20 is provided with an extension 21 to which a small diameter gear 22 is connected, the teeth of which mesh with the teeth of a relatively great diameter gear 23. The gears 22, 23 form the slow speed stage of the transmission. Numeral 24 designates an input shaft of a reversing gear and is placed coaxially of the shaft 20, 21. Numeral 25 designates a shaft supporting the aforementioned gear 23 and is placed coaxially of a second reversing gear shaft 26. The reversing gear shafts 24 and 26 carry input gears 27 and 28, respectively, whose teeth are in engagement with one another. Reversing gears 29 and 30 are rotatably carried by the shafts 24 and 26, respectively. The teeth of the gears 29 and 30 are radially spaced and in engagement with the teeth of an output gear 31 of the reversing gear. Numeral 32 designates the output shaft of the entire transmission which shaft is driven via a gear 33 by the gear 31 in one or in the opposite direction, the solid line arrow V indicating rotation of the shaft 32 for forward drive of the vehicle comprising the transmission and the dotted line arrow R indicating direction of rotation of the shaft 32 for reverse movement of the vehicle.

Numeral 34 designates a sleeve part of a claw clutch axially movable on the shaft 25 for connecting the low speed gear 23 to the gear 28. The mating part of the clutch is formed in the hub portion of the gear 28. Similarly, a claw clutch sleeve 36 is axially movable on the extension 21 of the turbine shaft 20 and is adapted to engage claws 37 formed in the hub portion of the input wheel 27 of the reversing gear. The claws 37 of the claw clutch 36, 37 are provided with locking claws 37' as shown in FIG. 1b and the claws 35 of the clutch 34, 35 are provided with locking claws 35' as shown in FIG. 1c. The claws of the claw clutches have engaging faces which extend substantially axially and have end faces which are inclined in a circumferential direction so that each claw has a relatively long axial engaging face and a relatively short axial engaging face. The claws 35', 37' extend from the relatively long engaging faces of the claws about halfway into the gaps between the claws. The claws 35', 37' have end faces which substantially form a continuation of the end faces of the respective claws 35, 37. A clutch of this type is shown in Patent No. 2,667,252.

Clutch sleeves 38 and 39 forming part of the reversing gear are axially slidable on hollow shafts 40 and 41, respectively, extending from the reversing gears 29 and 30 and being rotatable on the shafts 24 and 26, respectively. The reversing gear input gears 27, 28 are provided with claws 42, 43, respectively, adapted to engage corresponding claws provided on the clutch sleeves 38 and 39. The reversing claw clutches 38, 42 and 39, 43 may be constructed as rejecting claw clutches in the same manner as the change-speed gear claw clutches 36, 37 and 34, 35.

There is a speed of rotation equating device formed by a Föttinger fluid clutch 44 which can be filled with operating fluid and emptied and is mounted on the free end of the turbine wheel shaft 20 of the Föttinger group. The clutch 44 includes a housing provided with buckets 45 and rigidly connected to a housing 46 of the transmission. Buckets 47 of the Föttinger clutch 44 are connected to an element mounted on an axial extension 48 of the turbine wheel shaft 20.

*Operation*

The engine, not shown, drives the drive shaft 10 which drives through suitable speed changing gears pumps for the operating fluid of the converters, of controlling devices and for filling the Föttinger devices. The aforesaid pumps and devices supplied thereby with operating fluid are not illustrated because they do not form part of the present invention. When enough pressure fluid is available and reverse drive is desired the clutch sleeve 39 is moved to the right in FIG. 1a and engages the claws 43, if, accidentally, a claw is in front of a gap between claws of the opposite part, otherwise this engagement occurs upon movement of the gear 28. If low speed operation is desired, the clutch sleeve 34 is moved to the left and engages the claws 35 upon suitable relative position of the claws 35 and of the claws of the clutch part 34. If the relative position of the claws is not suitable, rotation of the turbine wheel 18 of the converter 14, filled with operating fluid, causes rotation of the shaft 25 by the gears 22, 23 in the direction of the dotted line arrow R shown at the end of the shaft 26 in FIG. 1a, so that the clutch 34, 35 can be engaged, as shown in FIG. 1a. This causes rotation of the input wheel 28 of the reversing gear so that also the clutch 39, 43 can be engaged and the shaft 32 is rotated via the gears 30, 31 and 33 and the vehicle driven thereby is put in motion. If maximum first speed effected by the converter 14 and the low speed gears 22, 23 is obtained, the converter 16 is filled and the converter 14 emptied and the transmission effects second speed without interrupting traction.

The final speed of the slow speed operating range with its first two speeds and small final traction is so chosen that an interruption of the traction due to shifting from the low speed range to the high speed range is hardly noticeable. For shifting from the low speed range to the high speed range the clutch sleeve 36 is moved to the left in FIG. 1a, its claws being rejected by the claws 37, as shown in FIG. 1b, because of the relatively high speed of the sleeve 36. The claw clutch 34, 35 is relieved by emptying the converter 14 and can be disengaged. At this operation the locking claws 35' are urged by springs, not shown, into the gaps between the claws 35 (FIG. 1c). The turbine shaft 20 with its extensions 48 and 21 is slowed up by filling the Föttinger clutch 44 so that the speed of rotation of the clutch sleeve 36 is reduced to a speed which is less than the speed of rotation of the claws 37. The claws of the sleeve 36 can now push back the locking claws 37' until the engaging faces of the claws 36 and 37 are aligned. The claws of the sleeve 36 have sufficient time to move fully into the gaps between the claws 37, which is important, because the torque to be transmitted is now great. The direct drive stage is now engaged and torque is transmitted through the input gear 27 to the gear 28. For shifting into the higher speed the converters 14 and 16 are emptied and filled, respectively, as is done when operating in the low speed range.

For changing from high speed to low speed the speed changes are effected at the lower speeds of the speed ranges, i.e. at transmission ratios of the torque converters which can be readily obtained in the conventional manner. Shifting operation for reverse movement is illustrated and described. The shifting operation for forward movement corresponds to that for the reverse movement. The following table shows the flow of power through the gears, converters and clutches at the four speeds available with the illustrated transmission and in both directions of movement:

Forward
speed:
1____ 11–12—14—22–23—34, 35—28–27—42, 38—29–31–33.
2____ 11–12—16—22–23—34, 35—28–27—42, 38—29–31–33.
3____ 11–12—14—22—36, 37—27—42, 38—29–31-33.
4____ 11–12—16—22—36, 37—27—42, 38—29–31-33.

Reverse
speed:
1____ 11–12—14—22–23—34, 35—28—43, 39—30–31-33.
2____ 11–12—16—22–23—34, 35—28—43, 39—30–31-33.
3____ 11–12—14—22—36, 37—27-28—43, 39—30–31-33.
4____ 11–12—16—22—36, 37—27-28—43, 39—30–31-33.

Transmissions according to the invention require little space and are inexpensive and are particularly suitable for multi-purpose diesel locomotives, because they can be used for extremely slow movement, for example, for switching, as well as for high speed movement on main lines and branch lines.

Use of the speed of rotation equating device as vehicle brake is of particular advantage at long declines whereby each speed of both speed ranges may be obtained and changed as required during movement of the vehicle.

The Föttinger circuits may be switched on and off by other means than filling and emptying such as removing or adjusting the position of the blades, or by using throttling devices such as annular valves and the like.

I claim:

1. A change-speed and reversing transmission comprising:
    a driving member,
    a group of individually operable Föttinger circuits including a first hydrodynamic device forming a fluid torque converter capable of substantially increasing torque, and at least one second hydrodynamic device,
    each of said hydrorynamic devices having input means and output means,
    said input means being interconnected and operatively connected to said driving member for drive thereby,
    a speed-changing gear having an input gear and an output gear,
    said input gear being connected to said output means of said hydrodynamic devices for drive thereby,
    said hydrorynamic devices being individually operable for selectively driving said input gear of said speed-changing gear either by the first hydrodynamic device at a relatively low speed range or by the second hydrodynamic device at a relatively high speed range,
    a reversing gear having two input gears and an output gear,
    means for selectively operatively connecting said input gear or said output gear of said speed-changing gear to a selected one of said input gears of said reversing gear for driving either one or the other of said input gears of said reversing gear by either the input or the output gear of said speed-changing gear for driving said output gear of said reversing gear at a selected direction of rotation and at a selected speed within the speed range defined by the hydrodynamic device which is in operation.

2. A change-speed and reversing transmission as defined in claim 1 wherein said second hydrodynamic device is a torque converter.

3. A change-speed and reversing transmission as defined in claim 1 wherein said second hydrodynamic device is a clutch.

4. A change-speed and reversing transmission as defined in claim 1 wherein said gears of said reversing gear and of said speed-changing gear are spur gears.

5. A change-speed and reversing transmission as defined in claim 1 wherein said input means of said hydrodynamic devices are pumps connected to a common hollow shaft, said output means of said hydrodynamic devices are turbines connected to a common shaft extending through said pump shaft, said input gear of said speed-changing gear is connected to said turbine shaft and is placed coaxial of one of said input gears of said reversing gear, said output gear of said speed-changing gear is coaxial of the second of said input gears of said reversing gear, said input gears of said reversing gear have like diameters and engage with one another, and said reversing gear has two reversing gear wheels, one of said reversing gear wheels being placed coaxially of one of said input gears of said reversing gear and the second reversing gear wheel being placed coaxially of the second input gear of said reversing gear.

6. A change-speed and reversing transmission as defined in claim 1 wherein said means for selectively operatively connecting said input gear or said output gear of said speed-changing gear to a selected one of said input gears of said reversing gear are rejecting claw clutches, a speed of rotation equating device being operatively connected to said output means of said hydrodynamic devices for equating the speeds of the gears connectable by said clutches and allowing engagement of said clutches.

7. A hydromechanical change-speed and reversing transmission having at least four speeds, particularly for rail vehicles and especially for multi-purpose diesel locomotives, comprising:
    a group of individually controllable hydraulic rotary torque converters,
    one of said torque converters being capable of substantially increasing torque,
    each of said converters having a pump wheel and a turbine wheel,
    a shaft common to said pump wheels,
    drive means for driving said shaft,
    a shaft common to said turbine wheels and concentric of said pump wheel shaft,
    a reversing gear comprising:
    a first shaft independent and coaxial of said pump wheel and turbine wheel shafts,
    a second shaft,
    a first spur gear on said first shaft,
    a second spur gear having the same diameter as said first spur gear and engaging with said first spur gear,
    a third spur gear on said first shaft,
    a fourth spur gear on said second shaft and having the same diameter as and being radially spaced from said third spur gear,
    one of the pairs of spur gears which have the same diameter being fast on the respective shafts and one of the pairs of spur gears having the same diameter being loose on the respective shafts,
    a clutch interposed between said first spur gear and said third spur gear, and
    a clutch interposed between said second spur gear and said fourth spur gear, for selectively connecting said spur gears;
    an output gear engaged by said third gear and said fourth spur gear;
    a change speed gear comprising:
    a first spur gear fast on said turbine wheel shaft,
    a second spur gear coaxial of said second shaft of said reversing gear and in engagement with said first spur gear of said change-speed gear, a rejecting claw clutch operatively interposed between said first spur gear of said change-speed gear and said first spur gear of said reversing gear, a rejecting claw clutch operatively interposed between said second spur gear of said change-speed gear and said second spur gear of said reversing gear, said rejecting claw clutches having clutch claws having end faces inclined in circumferential direction and having radial engaging faces extending in substantially axial direction; and means operatively connected to said turbine wheel shaft for adjusting the speed of said turbine wheel shaft to afford engagement of said claw clutches.

8. A transmission as defined in claim 7, wherein each of said claws of said rejecting claw clutches has a relatively long and a relatively short axial engaging surface, each of said rejecting claw clutches having two mating parts, spring-actuated locking claws extending from the axially relatively long engaging faces of the claws of one of said mating parts into substantially one half of the gaps between the clutch claws and having inclined end faces forming a continuation of the end faces of said clutch claws when the clutch is disengaged.

9. A transmission as defined in claim 7, wherein the diameter of said first spur gear of said change-speed gear is smaller than the diameter of said second spur gear of said change-speed gear.

10. A transmission as defined in claim 7, wherein said turbine wheel shaft has an extension, and said first spur gear of said change-speed gear is fast on said extension, a shaft being provided coaxial of said second shaft of said reversing gear, said second spur gear of said change-speed gear being fast on said last mentioned shaft, each of said rejecting claw clutches including a clutch sleeve, the sleeve of one of said rejecting clutches being axially slidable on said extension of said turbine wheel shaft, and the sleeve of the second rejecting clutch being axially slidable on the shaft whereon said second spur gear of said change-speed gear is made fast.

11. A transmission as defined in claim 7, wherein said means for adjusting the speed of the turbine wheel shaft is in the form of a brake operatively connected to said turbine wheel shaft.

12. A transmission as defined in claim 7, wherein said hydraulic converters are placed in mirror-symmetric relation, said shaft common to said pump wheels being hollow, said shaft common to said turbine wheels extending through said pump wheel shaft, a spur gear of relatively small diameter being placed on said pump wheel shaft between said converters, and a driving spur gear of relatively great diameter engaging with said spur gear of relatively small diameter for driving said last mentioned spur gear and said pump wheel shaft.

References Cited by the Examiner

UNITED STATES PATENTS

| | | | |
|---|---|---|---|
| 2,638,798 | 5/53 | Yingling | 74—732 |
| 2,653,673 | 9/53 | Peterson | 74—732 X |
| 2,839,011 | 6/58 | Kugel. | |
| 3,043,162 | 7/62 | Kugel et al. | 74—732 |

DON A. WAITE, *Primary Examiner.*